United States Patent [19]
Criscione et al.

[11] Patent Number: 5,880,628
[45] Date of Patent: Mar. 9, 1999

[54] HIGH-EFFICIENCY VOLTAGE BOOSTER CIRCUIT OPERATING AT VERY LOW SUPPLY VOLTAGE

[75] Inventors: Marcello Criscione, Ragusa; Giuseppe Scilla, Catania, both of Italy

[73] Assignee: Consorzio per la Ricerca sulla Microelettronica nel Mezzogiorno, Catania, Italy

[21] Appl. No.: 783,226

[22] Filed: Jan. 14, 1997

[30] Foreign Application Priority Data

Jan. 15, 1996 [EP] European Pat. Off. ............... 96830014

[51] Int. Cl.⁶ ....................................... G05F 3/16
[52] U.S. Cl. ............................. 327/589; 327/537
[58] Field of Search .................... 327/534, 536, 327/537, 538, 540–543, 546, 589, 530, 390, 333; 365/189.09, 177, 204, 149, 189.11

[56] References Cited

U.S. PATENT DOCUMENTS

| | | | |
|---|---|---|---|
| 4,961,007 | 10/1990 | Kumanoya et al. | 327/537 |
| 5,162,668 | 11/1992 | Chen et al. | 327/589 |
| 5,168,174 | 12/1992 | Naso et al. | 327/540 |
| 5,394,365 | 2/1995 | Tsukikawa | 365/189 |
| 5,404,329 | 4/1995 | Yamagata et al. | 365/189 |
| 5,546,296 | 8/1996 | Savignac et al. | 327/536 |

*Primary Examiner*—Tim Callahan
*Assistant Examiner*—My-Trang Nu Ton
*Attorney, Agent, or Firm*—Wolf, Greenfield & Sacks, P.C.

[57] ABSTRACT

A voltage booster circuit including a pull-up capacitor connected to the supply line via a PMOS switching transistor. The other terminal of the pull-up capacitor is supplied with a pull-up voltage switching between a first value determining charging of the capacitor, and a second value higher than the first and determining pull-up of the capacitor. A negative voltage source presents an output connected to the control terminal of a switch transistor, and generates a negative voltage of a value lower than the first pull-up voltage value when charging the capacitor, so as to saturate the switch transistor and charge the capacitor to a voltage close to the supply voltage.

51 Claims, 7 Drawing Sheets

HIGH-EFFICIENCY VOLTAGE BOOSTER CIRCUIT OPERATING AT VERY LOW SUPPLY VOLTAGE

BACKGROUND OF THE INVENTION

1. Field of the Invention

The present invention relates to a high-efficiency voltage booster circuit operating at very low supply voltage.

Though applicable in particular to switching regulators featuring N-channel power MOS transistors which require a high gate potential for proper operation, the present invention may also be applied to any device comprising a pass MOS transistor which operates at very low supply voltage. In particular, the present invention may be applied to all MOS and combined BJT/MOS technologies with threshold voltages above or comparable with the supply voltage. For example, the present invention may be applied to devices used in pagers, cordless systems, radio-controlled systems and Local Area Networks which are supplied by a single low-voltage battery and which, according to present standards, must operate at supply voltages of 800 mV or at most 900 mV.

2. Discussion of the Related Art

As is known, the physical performance of switching regulators featuring MOS transistors for controlling the current in the inductor should simulate, as closely as possible, that of an ideal switch. That is, ideally, the MOS transistor should present zero resistance between the drain and source when on. In actual fact, however, this never occurs. The resistance of the transistor when on equals $R_{ds,on}$, and must be minimized as much as possible to reduce the voltage drop and power dissipation of the transistor to achieve a good degree of efficiency of the regulator.

As is known, the voltage drop of the transistor is inversely proportional to both its area and overdrive (i.e. the excess gate-source voltage in relation to the turn-on threshold voltage of the transistor). Therefore, if a limited area of the MOS transistor is required, as in the case of currently used integrated devices, which are necessarily increasingly smaller and mounted in very small packages, the only alternative is to work on the overdrive voltage of the transistor ($V_{ov}=V_{gs}-V_{th}$). That is, for the switching regulator to operate properly, a high overdrive must be assured.

On the other hand, a high overdrive also means a high gate-source voltage $V_{gs}$, which poses problems in the case of the circuits with low supply voltages mentioned previously. This is because the minimum threshold voltages achievable by the best technologies currently available are comparable with, if not less than, the low supply voltages required. Nor is it possible, at the low supply voltages considered, to use diodes as unilateral switches.

As such, recourse must be made to voltage boosters or pumps capable of generating, from a low supply voltage, a higher voltage for gate driving MOS transistors.

Known voltage boosters include what are referred to as Cockroft-Walton second or higher-order multipliers. These multipliers operate in accordance with a succession of steps comprising: charging a capacitor to a voltage correlated to the supply voltage; pulling up one terminal of the capacitor; and connecting the other terminal of the capacitor to an output via controlled switches to achieve an output voltage higher than the supply voltage.

FIG. 1 shows one example of a third-order multiplier 1 comprising three PNP transistors 2, 3 and 4 and two NPN transistors 5 and 6 connected between a supply line at $V_{dd}$ and ground. More specifically, transistor 2 has an emitter terminal connected to the supply voltage $V_{dd}$, a base terminal connected to the base terminal of transistor 3 and to the emitter terminal of transistor 4, and a collector terminal connected to the collector terminal of transistor 5, to the base terminal of transistor 4 and to the base terminal of transistor 6. Transistor 3 has an emitter terminal connected to the supply voltage $V_{dd}$, and a collector terminal connected to a node 8. Transistor 4 has a collector terminal which is grounded. Transistor 5 has a base terminal defining an input 9 at which it receives a turn-on signal $V_1$, and an emitter terminal grounded via a resistor 10. Transistor 6 has an emitter terminal which is grounded. Circuit 1 also comprises two capacitors 12, 13, each having one terminal 15, 16, respectively, which defines an input for respective push-pull digital control signals S1, S2, and the other terminal A, B of each, respectively, which is connected to a respective terminal of a chain of diodes 17, 18, 19. More specifically, diode 17 is connected at the anode to node 8, and at the cathode to terminal A and to the anode of diode 18. The cathode of diode 18 is connected to terminal B and to the anode of diode 19, and the cathode of diode 19 forms an output terminal 20 which outputs a voltage O.

Components 2–6 and 10 form an input stage for transferring the supply voltage $V_{dd}$ to node 8 when $V_1$ is high. In this condition, it is assumed S1 is low and S2 is high at an instant $t_0$, so that a potential $V_A$ at terminal A equals:

$$V_A(t_0)=V_{dd}-V_{cesat,3}-V_{d,17}$$

where $V_{cesat,3}$ is the collector-emitter voltage drop across transistor 3 when saturated; and $V_{d,17}$ is the voltage drop across diode 17.

A potential $V_B$ at terminal B, on the other hand, equals:

$$V_B(t_0)=V_{dd}-V_{cesat,3}-V_{d,17}-V_{d,18}$$

where $V_{d,18}$ is the voltage drop across diode 18. For example, if voltage $V_{dd}$ equals 5 V, if $V_{cesat,3}$ equals 0.3 V, and if the voltage drop of the diodes equals 0.7 V, then $V_A(t_0)=4$ V and $V_B(t_0)=3.3$ V.

At an instant $t_1$, S1 switches to high ($V_{dd}$) and S2 to low, and, since capacitor 12 is already charged, terminal A is brought to potential:

$$V_A(t_1)=V_A(t_0)+V_{dd}$$

diode 17 turns off, and terminals B and 20 are brought to potential:

$$V_B(t_1)=V_A(t_1)-V_{d18}$$

$$V_{20}(t_1)=V_B(t_1)-V_{d19}$$

where $V_{d,19}$ is the voltage drop across diode 19. In the example shown, $V_A(t_1)=9$ V, $V_B(t_1)=8.3$ V and $V_{20}(t_1)=7.6$ V.

At an instant $t_2$, S1 switches back to low and S2 to high ($V_{dd}$), diode 18 turns off, and the potentials at terminals A, B and 20 equal:

$$V_A(t_2)=V_A(t_0)=4\text{ V}$$

$$V_B(t_2)=V_B(t_1)+V_{dd}=13.3\text{ V}$$

$$V_{20}(t_2)=V_B(t_2)-V_{d19}=12.6\text{ V}$$

As can be seen, the loss in efficiency of the circuit of FIG. 1 is considerable, mainly because of the voltage drop across diodes 17–19. This prevents the circuit from being used in the presence of very low supply voltages (800 mV mentioned previously) at which it is not even possible to charge capacitors 12 and 13 because of the voltage drop across diodes 17, 18.

SUMMARY OF THE INVENTION

It is an object of the present invention to provide a voltage booster circuit capable of operating even with a low supply voltage, and in particular when the supply voltage is comparable with or even below the threshold voltage of MOS transistors.

According to the present invention, there is provided a high-efficiency voltage booster circuit with a very low supply voltage.

In practice, according to the present invention, the pull-up capacitor is charged by a MOS transistor which, when saturated, presents a very low drain-source voltage drop, and so permits the capacitor to be charged almost to the supply voltage. To ensure a gate-source voltage sufficient to saturate the MOS transistor even with a very low supply voltage, a P-channel transistor is used, and a negative gate drive voltage is generated when charging the capacitor.

In a preferred embodiment of the present invention, a voltage booster circuit is disclosed, comprising a first reference potential line, at least a first pull-up capacitor with a first and second terminal and a switching element interposed between the first reference potential line and the first terminal of the first capacitor. The second terminal of the first capacitor receives a pull-up signal switching between a first value and a second value higher than the first value. The circuit is characterized in that the switching element comprises a PMOS switching transistor with a control terminal; and in that it comprises negative voltage source means having an output connected to the control terminal of the switching transistor, for generating a control signal of a third value lower than the first value of the pull-up signal. The negative voltage source means is turned on when the pull-up signal presents the first value. The negative voltage source means comprises a second capacitor with a first and second terminal; and a MOS latch transistor with a first, second and control terminal. The first terminal of the second capacitor is connected to the second terminal of the first capacitor, the second terminal of the second capacitor is connected to the first terminal of the MOS latch transistor, the second terminal of the MOS latch transistor is connected to the control terminal of the switching transistor, and the control terminal of the latch transistor receives a square-wave oscillating signal.

In another embodiment of the invention, a voltage boost circuit is disclosed, comprising an input stage having an input and an output, an output stage having an output, a first transistor having a first terminal coupled to a first voltage supply, a second terminal and a third terminal, a first capacitor having a first terminal coupled to the second terminal of the first transistor and a second terminal coupled to the output of the input stage, a second transistor having a first terminal, a second terminal coupled to the third terminal of the first transistor and a third terminal coupled to the input of the input stage and a second capacitor having a first terminal coupled to the second terminal of the first capacitor and a second terminal coupled to the first terminal of the second transistor.

In another embodiment of the invention, a voltage booster circuit is disclosed, comprising first storage means having a first terminal and second terminal, first switch means having a first terminal connected to a first reference voltage and a second terminal connected to the first terminal of the first storage means and a negative voltage source connected between the second terminal of the first storage means and a control terminal of the first switch means. A pull-up voltage is supplied to the second terminal of the first storage means, the pull-up voltage switching between a first value and a second value higher than the first value. When the pull-up voltage is at the first value, the negative voltage source supplies the control terminal of the first switch means with a voltage of a third value which is lower than the first value, to saturate the first switch means and charge the first storage means to approximately the first reference voltage. The circuit further comprises an input stage having an input terminal for receiving an input signal and an output terminal for outputting the pull-up voltage. The negative voltage source comprises a second switch means having a control terminal connected to the input terminal of the input stage and a first terminal connected to the control terminal of the first switch means, and a second storage means, having a first terminal connected to the second terminal of the first storage means and a second terminal connected to a second terminal of the second switch means.

BRIEF DESCRIPTION OF THE DRAWINGS

A preferred, non-limiting embodiment of the present invention will be described by way of example with reference to the accompanying drawings, in which.

DETAILED DESCRIPTION

Figure 2:
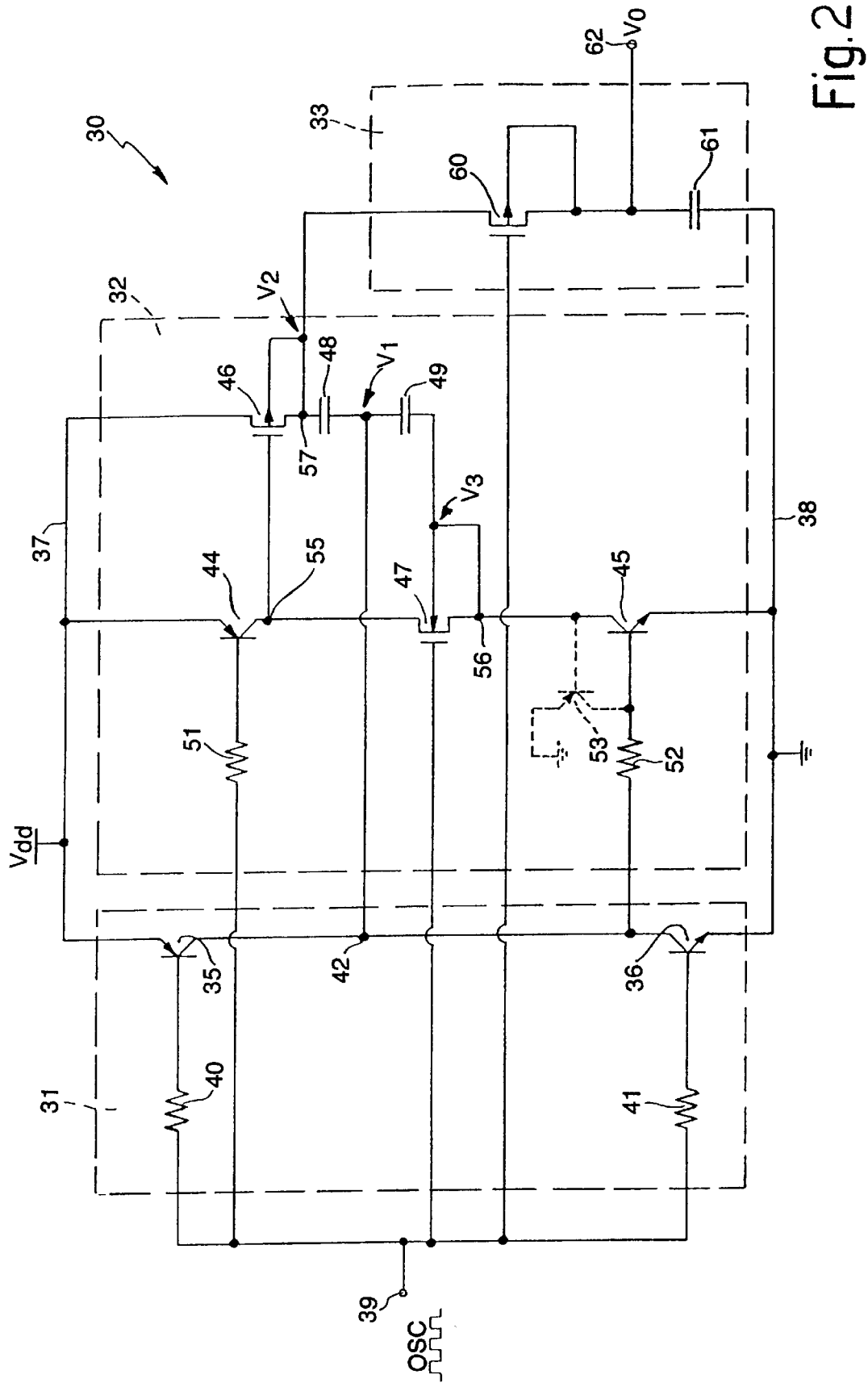
FIG. 2 shows a circuit diagram of one embodiment of the voltage booster according to the present invention.

Number 30 in FIG. 2 indicates a voltage booster circuit comprising an input stage 31, a charge pump stage 32, and an output stage 33. Input stage 31 is a bipolar inverting type comprising a first PNP bipolar transistor 35 and a second NPN bipolar transistor 36, both connected between a supply line 37 at $V_{dd}$ and a ground line 38. More specifically, transistor 35 has an emitter terminal connected to supply line 37, a base terminal connected to an input terminal 39 via a resistor 40, and a collector terminal connected to a node 42. Transistor 36 has a collector terminal connected to node 42, a base terminal connected to input terminal 39 via a resistor 41, and an emitter terminal connected to ground 38. Input terminal 39 receives a square-wave signal OSC, not necessarily rail-to-rail, generated by an oscillator (not shown).

Charge pump stage 32 comprises third and fourth bipolar transistors 44, 45, first and second MOS transistors 46, 47, and first and second capacitors 48, 49. Transistor 44, which is a PNP type, has an emitter terminal connected to supply line 37, a base terminal connected to input terminal 39 via a resistor 51, and a collector terminal connected to a node 55. Transistor 47, which is an N-channel type, has a drain terminal connected to node 55, a gate terminal connected to input terminal 39, a source terminal connected to a node 56, and a body region connected to the source terminal. Transistor 45, which is an NPN type, has a collector terminal connected to node 56, a base terminal connected to node 42 via a resistor 52, and an emitter terminal which is grounded. A parasitic PNP transistor 53 is also shown by dotted lines, having a collector in common with the base region of transistor 45, a base in common with the collector region of transistor 45, and an emitter which is grounded.

Transistor 46, which is a P-channel type, has a source terminal connected to supply line 37, a gate terminal connected to node 55, a drain terminal connected to a node 57, and a body region connected to the source terminal. Capacitor 48 has a first terminal connected to node 57, and a second terminal connected to node 42; and capacitor 49 has a first terminal connected to node 42, and a second terminal connected to node 56.

Output stage 33 comprises a P-channel MOS transistor 60 and a capacitor 61. Transistor 60 has a source terminal connected to node 57, a gate terminal connected to input terminal 39, a drain terminal connected to an output terminal 62, and a body connected to the drain terminal. Capacitor 61 is connected between output terminal 62 and ground 38. Output terminal 62 may be connected to the gate terminal of an NMOS transistor (not shown) forming part of a switching regulator as stated previously.

Operation of the circuit of FIG. 2 will be described with reference also to FIGS. 3 and 4. Initially, when the circuit is turned on, voltage $V_{dd}$ is low but rising, and input signal OSC is low, so that transistors 36 and 47 are off, and transistors 35 and 44 are turned on. During the transient state in which supply voltage $V_{dd}$ is increasing (after about 25 μs in the simulation shown), a voltage peak occurs at node 56 (voltage $V_3$ in FIG. 3) due to the low OSC signal. In fact, transistor 35 is conducting and pulls up node 42, and capacitor 49, which is discharged, connects node 56 to node 42. As supply voltage $V_{dd}$ increases, transistor 45 is also turned on and for the same area, conducts three times the current of transistor 44. As a result, transistor 45 draws node 56 towards ground and down to the saturation voltage of transistor 45, so that capacitor 49 is charged to voltage $V_1-V_3$ according to the equation:

$$V_1-V_3=V_{dd}-V_{cesat,35}-V_{cesat,45}$$

where $V_{cesat,35}$ and $V_{cesat,45}$ are the collector-emitter saturation voltages of transistors 35, 45 respectively.

Figure 3:
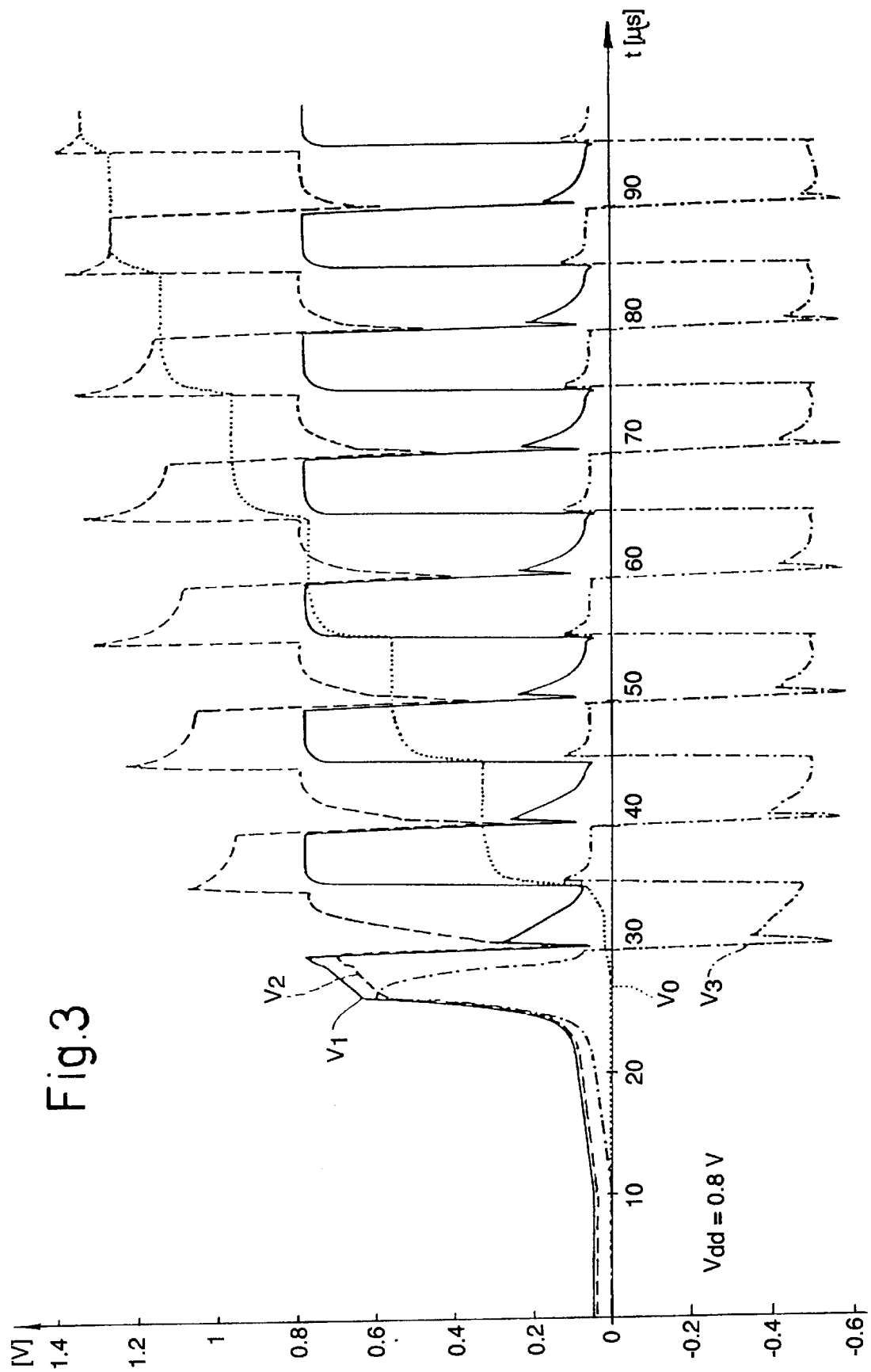
FIGS. 3 and 4 show plots of voltages measured at certain points in the circuit of FIG. 2.

At the end of the output transient state of supply voltage $V_{dd}$ (after about 30 μs), input signal OSC switches to high, thus turning off transistors 35, 44 and turning on transistor 36, which saturates and turns off transistor 45. As a result, node 42, at potential $V_1$, falls to the saturation voltage $V_{cesat,36}$ of transistor 36, and, having been charged during the turn-on transient state, capacitor 49 pushes node 56 to a negative potential $V_3$ according to the equation:

$$V_3=-(V_{dd}-V_{cesat,35}-V_{cesat,45}-V_{cesat,36})$$

as shown in FIG. 3. In the FIG. 3 simulation using a $V_{dd}$ of 800 mV, $V_3$ represents a negative swing to about −600 mV.

Together with the high state of signal OSC, this negative voltage produces, between the gate and source terminals of MOS transistor 47, a voltage drop $V_{gs,47}$ of:

$$V_{gs,47}=OSC+V_3$$

As a result, assuming OSC in the high state represents a value of 740 mV (peak-peak voltage of 680 mV), then $V_{gs,47}$=1.34 V, which is more than sufficient to turn on and saturate transistor 47. The extremely small drain-source voltage drop $V_{ds,47}$ and the off state of transistor 44 connect the gate terminal of P-channel transistor 46 to −600 mV (voltage $V_3$,) so that, disregarding voltage $V_{ds,47}$, transistor 46 presents a gate-source voltage drop $V_{gs,46}$ according to the equation:

$$V_{gs,46}=V_{dd}-V_3 \cong 1.4 \text{ V}$$

The turning on of transistor 46 brings node 57 to voltage $V_2 \cong V_{dd}$=800 mV, and causes capacitor 48 to charge to voltage $V_2-V_1$ according to the equation:

$$V_2-V_1=V_{dd}-V_{ds,46}-V_{cesat,36} \cong 700 \text{ mV}$$

As such, transistor 60 of output stage 33 is off, due to the high potential (OSC) at its gate terminal, but nevertheless conducts a small amount of current, as explained below with reference to FIG. 5, which shows a simplified cross section of a P-channel MOS transistor.

Figure 1:
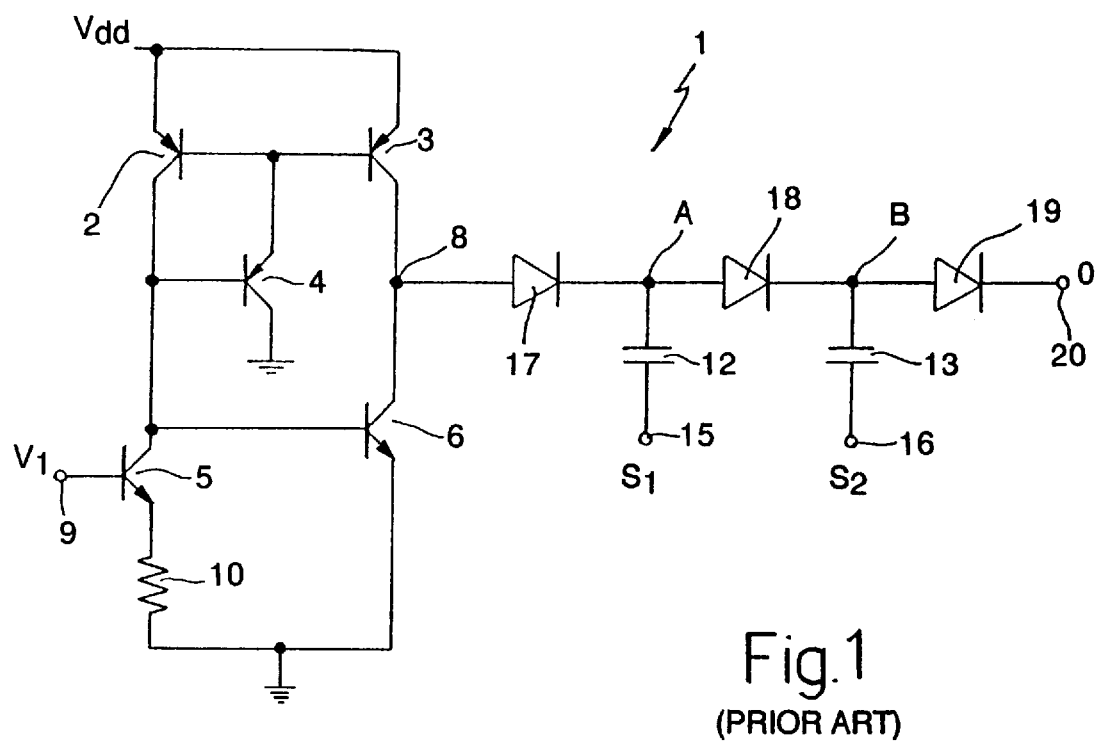
FIG. 1 shows a circuit diagram of a known voltage booster.
Figure 5:
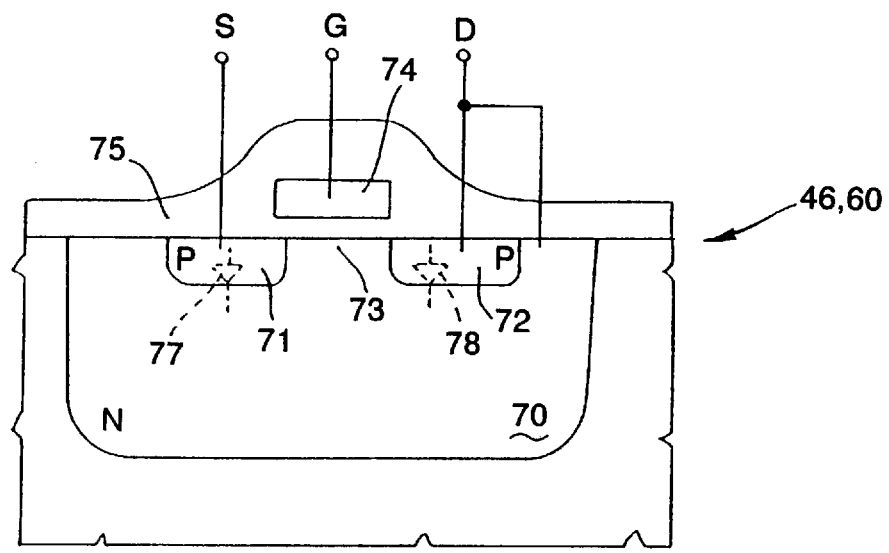
FIG. 5 shows a cross section of a wafer of semiconductor material implementing a P-channel MOS transistor.

As shown in FIG. 5, transistor 60 (or 46, which is formed the same way) comprises an N-type body region 70 housing a P-type source region 71 and a P-type drain region 72 separated by a portion of body region 70 forming channel 73. A gate region 74 is located over channel region 73 and is insulated electrically from it by an oxide layer 75. Source and gate regions 71, 72 form PN junctions with body region 70 (diodes 77, 78 shown by the dotted lines). As shown schematically, and unlike standard MOS transistors, body region 70 is shorted to drain region 72.

Due to the peculiar connection of body region 70 of transistor 60 to drain region 72, and the fact that capacitor 61 is still at a low voltage (as in the first cycle of the OSC signal), parasitic diode 77 between source region 71 (connected to node 57 at $V_{dd}$) and body region 70 (connected to output terminal 62 still at a low voltage) are biased directly and conduct a small amount of current. This causes capacitor 61 to begin charging, as shown in the FIG. 3 simulation.

When signal OSC switches back to the low potential, transistors 47, 36 turn off and transistors 35, 44 turn on, so that transistor 46 is also turned off and transistor 45 is turned on to increase potential $V_3$ at node 56 once more to $V_{cesat,45}$. The simultaneous rise in potential $V_1$ at node 42, by virtue of being connected to supply line 37 by transistor 35, on the one hand charges capacitor 49 for the next cycle, and on the other increases potential $V_2$ at node 57 to:

$$V_2=(-V_{dd}-V_{ds,46}-V_{cesat,36})+(V_{dd}-V_{cesat,35})$$

where the first term in brackets represents a voltage which results from the previous charge of capacitor 48, and the second term in brackets represents potential $V_1$ at node 42.

Since, at this point, the potential at the gate terminal of transistor 60 is low (like signal OSC) and its source terminal (connected to node 57) is at potential $V_2$, the gate-source voltage drop is high enough to make transistor 60 highly conductive and so permit charge transfer from capacitor 48 to capacitor 61, as shown by the $V_2$ and $V_0$ curves in the FIG. 3 simulation.

Figure 4:
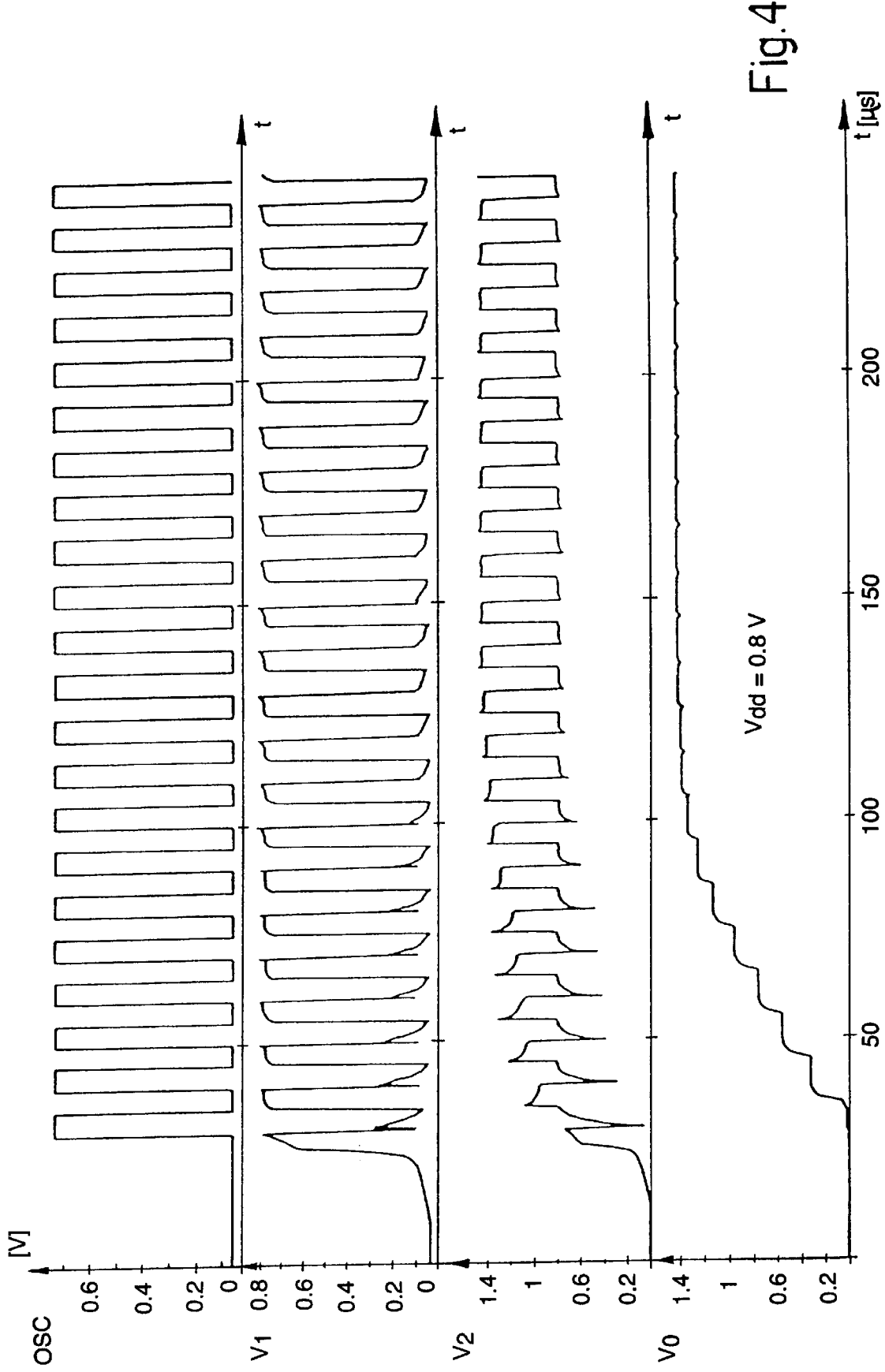

Alongside successive switching of signal OSC, capacitor 61 is charged up to about 1.4 V, as shown in the FIG. 4 simulation which shows the data with reference to a smaller time scale than that in FIG. 3.

As can be seen, with the numerical values indicated, output voltage $V_O$ therefore reaches a value of 1.4 V to be compared to the maximum theoretical value of $2V_{dd}$=1.6 V, so that the circuit presents an efficiency of 88.125% and is capable of functioning with a supply voltage $V_{dd}$ of as little as 700 mV or even 600 mV.

In the FIG. 2 circuit, resistors 40,41 and 51,52 provide for introducing a certain delay between the switching of signal OSC and transistors 35,36 and 44,45 respectively. This ensures synchronous operation of the circuit as a whole, which is further assisted by transistor 47 ensuring immediate latching of node 55 to node 56, and the rapid negative voltage transition of node 56 following switching of signal OSC.

The parasitic transistor 53 shown by the dotted lines in FIG. 2 is turned on when node 56 falls below ground in the case of a P-type substrate. In fact, together with the P-type substrate, the base-collector junction of transistor 45 forms a parasitic vertical PNP transistor having the base of transistor 45 as the collector, the collector of transistor 45 as the base, and the grounded substrate as the emitter. When node 56 (as also the collector of transistor 45 and the base of transistor 53) falls below ground, the base terminal of transistor 45 (collector of transistor 53) is connected to node 42 slightly above ground, and directly biases the base-collector junction of transistor 53. Transistor 53 then is turned on and limits the fall of node 56 at potential $V_3$ to its base-emitter voltage drop $V_{be}$, as shown in the FIG. 3 simulation. Even with this limitation, the circuit nevertheless operates correctly as described above.

The peculiar connection of the body region of transistors 46 and 60 in the FIG. 2 circuit will now be explained with reference to FIG. 5. If the body region 70 of transistor 46 were shorted to source region 71 in the usual way, problems could arise when turning off transistor 46, when signal OSC is high and node 57 is at a much higher voltage than $V_{dd}$. In this case, in fact, diode 78 at the drain-body junction would be biased directly and turned on, thus maintaining the voltage drop at the junction equal to $V_{be}$. As a result, the diode would limit the increase in potential $V_2$ at node 57 to $V_{dd}+V_{be}$, i.e. to the potential of the source and body regions plus the voltage drop of the diode, as well as discharging capacitor 48 towards body region 70. Conversely, with the connection shown, this does not occur. In fact, parasitic diode 78 is shorted, and parasitic diode 77 between the body and source regions is biased inversely when transistor 46 is off (body region 70 at a much higher voltage $V_2$ than $V_{dd}$, and source region 71 at $V_{dd}$). Parasitic diode 77 is biased at below threshold voltage when transistor 46 is on (body region 70 at a lower voltage than source region 71, to the amount of $V_{ds,46}$ equal to a few mV).

Similarly, the peculiar connection of the body region of transistor 60 has the effect of charging capacitor 61 as soon as the circuit is turned on, even when transistor 60 is off, as described above. This, however, is in no way disadvantageous, and the connection provides for ensuring correct operation after capacitor 61 is charged. In fact, as shown in FIGS. 2 and 5, a conventional connection of body region 70 to source region 71 would turn on diode 78 between the drain and body when transistor 60 is off. More specifically, in this condition (signal OSC high, capacitor 48 charging), the potential of the drain region (connected to capacitor 61 charged to almost $2V_{dd}$) would be much higher than the potential of source region 71 and body region 70 (roughly equal to $V_{dd}$). The potential of the drain region would be higher than the threshold voltage of diode 78, so that diode 78, when on, would discharge capacitor 61 towards node 57. Conversely, with the connection shown, diode 78 is shorted, and diode 77 is biased inversely when transistor 60 is off.

Should circuit 30 in FIG. 2 be operated at supply voltages higher than the low levels considered ($V_{dd}$ of 1.2–1.3 V and over), when charging capacitor 48 (when signal OSC is high and transistor 60 should be off), the drain-gate voltage drop of transistor 60 is greater than its turn-on threshold. Therefore, transistor 60 can never be turned off, thus discharging output capacitor 61 towards stage 32.

Figure 6:
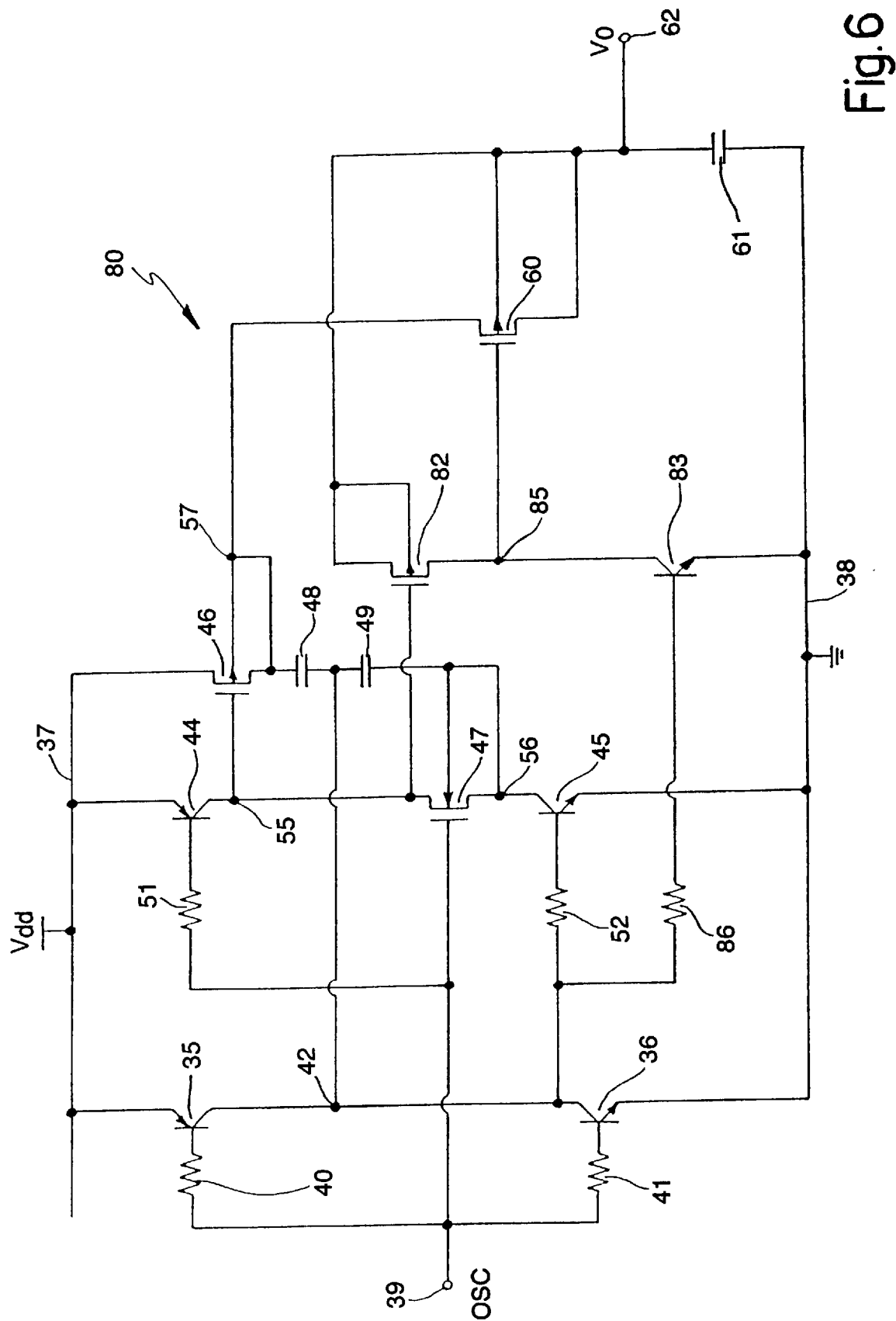
FIG. 6 shows a variation of the circuit of FIG. 2.

To solve this problem, instead of being controlled directly by square-wave signal OSC, transistor 60, in circuit 80 in FIG. 6, is controlled by a P-channel MOS transistor 82 and a bipolar NPN transistor 83. More specifically, a gate terminal of transistor 60 is connected to a node 85 which is also connected to a drain terminal of transistor 82 and a collector terminal of transistor 83. Transistor 82 has a source terminal connected to output terminal 62, a gate terminal connected to node 55, and a substrate connected to the source terminal thereof. Transistor 83 has an emitter terminal connected to line 38 (ground), and a base terminal connected to node 42 via a resistor 86. The rest of circuit 80 is identical to circuit 30 in FIG. 2, and therefore requires no further description.

When signal OSC switches to low, node 42 switches to high and (with a slight delay due to resistor 86) turns on transistor 83, which grounds node 85, thus turning on transistor 60. Transistor 60 operates in exactly the same way as in the FIG. 2 circuit, to permit charge transfer from capacitors 48, 49 to capacitor 61. At this stage, transistor 82 is off, due to the high state of node 55. Conversely, when signal OSC switches to high and node 55 is below ground due to capacitor 49 and transistor 47, transistor 82 is turned on and shorts the drain and gate terminals of transistor 60 to ensure that transistor 60 is turned off. At this stage, transistor 83 is off.

Figure 7:
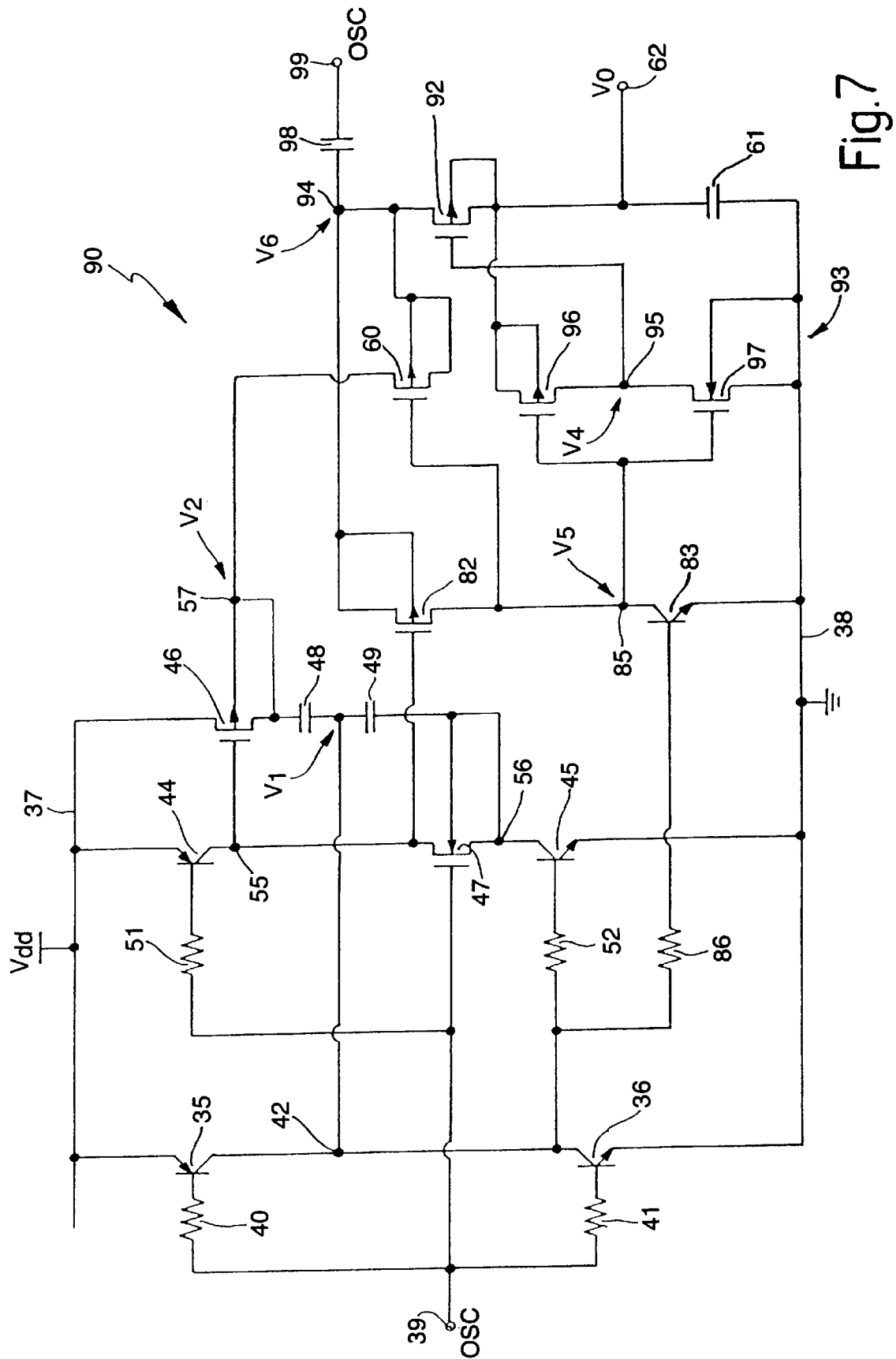
FIG. 7 shows a circuit diagram of a third-order voltage booster in accordance with the present invention.

FIG. 7 shows a variation of the FIG. 6 circuit operating as a voltage triplicator, i.e. as a Cockroft-Walton third-order multiplier. Instead of being connected directly to output terminal 62, the drain terminal of transistor 60 in circuit 90 of FIG. 7 is connected to output terminal 62 via a P-channel MOS transistor 92, which is controlled by an inverter 93. More specifically, transistor 92 has a source terminal (defining node 94) connected to the drain terminal of transistor 60, a gate terminal connected to output node 95 of inverter 93, a drain terminal connected to output terminal 62 of the circuit, and a substrate connected to the drain terminal. Inverter 93 comprises a pair of complementary transistors 96, 97. Transistor 96, which is a PMOS type, has a source terminal connected to output terminal 62 (and to its own substrate), a drain terminal connected to output node 95, and a gate terminal connected to node 85. Transistor 97, which is an NMOS type, has a drain terminal connected to node 95, a gate terminal connected to node 85, and a source terminal (and substrate) connected to ground line 38. Circuit 90 also comprises a capacitor 98 connected between node 94 and an input terminal 99 supplied with signal OSC at terminal 39. The rest of circuit 90 is identical to circuit 80.

In circuit 90 of FIG. 7, when signal OSC is low, node 57 is at roughly $2V_{dd}$ (as described with reference to FIG. 2), node 42 is high, transistor 83 is turned on, node 85 is grounded and transistor 60 is turned on and also brings node 94 to approximately $2V_{dd}$. Terminal 99 is also low, so that capacitor 98 is charged to approximately $2V_{dd}$. Since node 85 is grounded, transistor 96 is turned on, thus shorting the drain and gate terminals of transistor 92, which is therefore off.

When signal OSC switches to high, transistor 47 is turned on, so that node 55 is brought below ground, as described previously. Transistor 82 is turned on and transistor 60 is turned off; node 94 is brought to roughly $3V_{dd}$ due to the high state of input terminal 99. Transistor 82 brings node 85 to roughly $3V_{dd}$, thus turning off transistor 96 and turning on transistor 97 which grounds node 95. Transistor 92 is turned on to latch node 94 to output terminal 62 and so permit charge transfer from capacitor 98 to capacitor 61.

Figure 8:
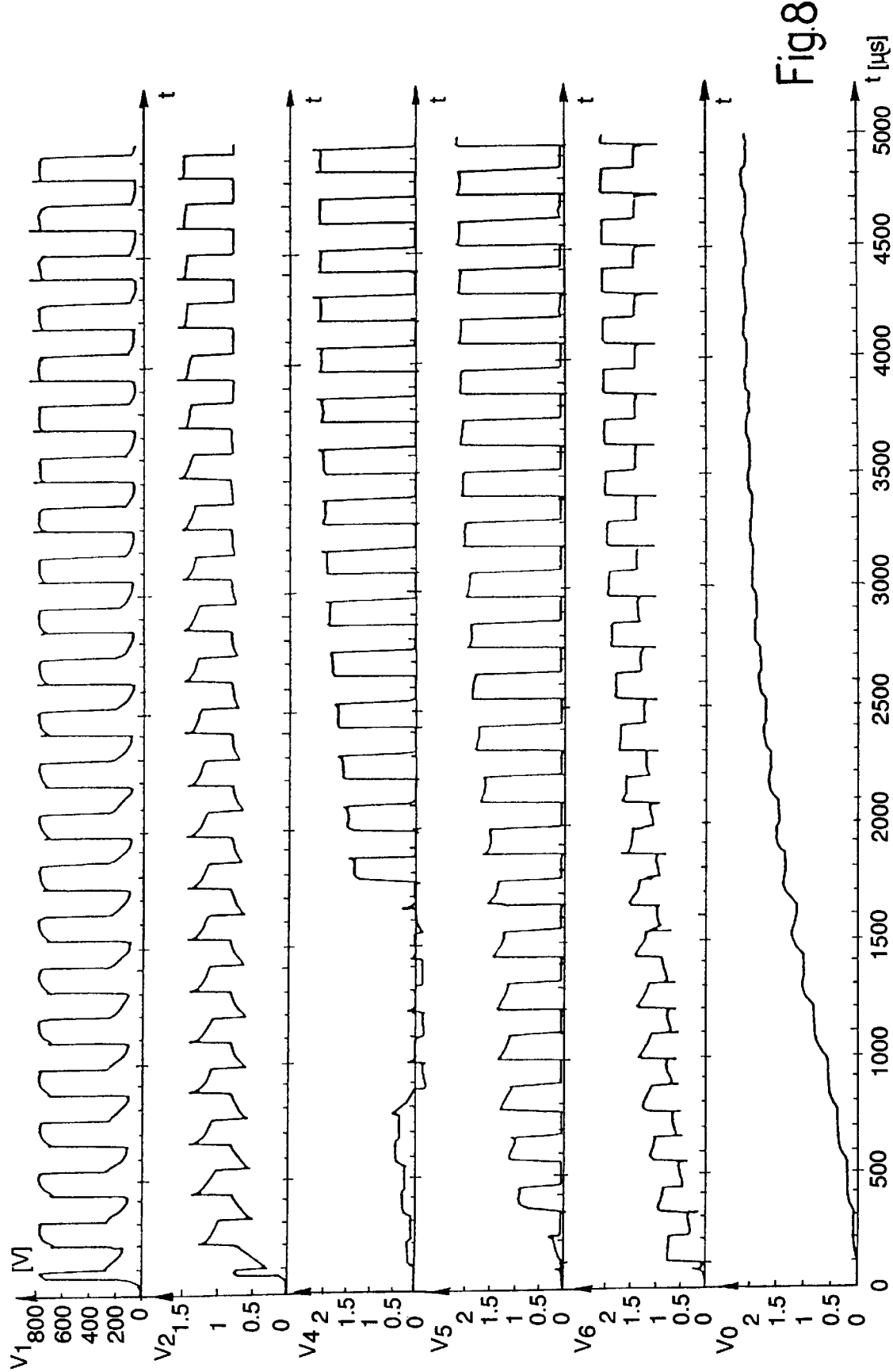
FIG. 8 shows plots of voltages measured in the circuit of FIG. 7.

Operation of the FIG. 7 circuit is also clearly deducible from the FIG. 8 simulation, wherein $V_1$ indicates the voltage at node 42, $V_2$ the voltage at node 57, $V_4$ the voltage at node 95, $V_5$ the voltage at node 85, $V_6$ the voltage at node 94, and $V_O$ the output voltage at terminal 62.

During the first few operating cycles, the efficiency of circuit 90 is poor, due to the uncertainty of transistor 96, which is not completely turned on when charging capacitor 98 (signal OSC low) or completely turned off at the opposite stage. In fact, initially, when output voltage $V_O$ at output terminal 62 is still low ($V_O < V_{th}$, where $V_{th}$ is the threshold voltage of transistor 96) and signal OSC and node 85 are low, the source-gate voltage drop of transistor 96 is also low, thus preventing it from being turned on properly and in turn from ensuring transistor 92 is turned off altogether. Similarly, when signal OSC is high, transistor 96 may not be turned off altogether, thus preventing transistor 92 from being turned on fully. This does not prevent the circuit from being started correctly, however. In fact, when signal OSC is low, because of the peculiar connection of the substrate and drain of transistor 92, as described with reference also to FIG. 5, diode 77 between the source region and body/drain region of transistor 92 is biased directly and turned on. Therefore, node 94 is connected to output terminal 62 to permit a rapid initial charge of capacitor 61 until output voltage $V_O$ reaches the threshold value of transistor 96. Conversely, when the output voltage is high ($<2V_{dd}$), and it is essential, when signal OSC is low, that transistor 92 be turned off to prevent return of the charge, transistor 96 is definitely turned on.

The advantages of the circuit described are as follows. Firstly, as stated, by virtue of featuring no diodes or bipolar transistors as switching elements, the circuit according to the invention presents a high degree of efficiency, even in the case of low-capacitance pull-up capacitors. Secondly, by virtue of clipper-inverter stage 31, which also operates as a level shifter and delay controller, the circuit may be driven by a square-wave, non-rail-to-rail clock voltage. And thirdly, by virtue of the circuit arrangement shown, an exponential increase in supply voltage may be achieved using a number of cascade-connected circuits, as shown in FIG. 7, to form a third-order multiplier and so enable troublefree control of the drive voltages at the gate terminals of power MOS transistors.

Clearly, changes may be made to the circuit as described and illustrated herein without, however, departing from the scope of the present invention. In particular, in parallel with bipolar transistors 35, 36, 44, 45 and possibly also 83, provision may be made for respective MOS transistors capable of superimposing their perfect-switch characteristic (low $R_{ds,on}$) on that of the bipolar transistors to enhance the efficiency of the circuit, providing the supply voltage $V_{dd}$ and the amplitude of signal OSC exceed the MOS threshold voltages in the technology employed. In which case, the bipolar transistors in parallel with the MOS transistors will only conduct minimally, the current being almost completely drained by the MOSFET transistors.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A voltage booster circuit comprising a first reference potential line having a reference voltage; at least a first pull-up capacitor with a first and second terminal; and a switching element coupled between said first reference potential line and said first terminal of said first capacitor; said second terminal of said first capacitor receiving a pull-up signal switching between a first value and a second value higher than the first value; wherein said switching element comprises a PMOS switching transistor with a control terminal; the circuit further comprising negative voltage source means having an output connected to said control terminal of said switching transistor, for generating a control signal of a third value lower than said first value of said pull-up signal and lower than said reference voltage; said negative voltage source means being turned on when said pull-up signal presents said first value.

2. A voltage booster circuit comprising a first reference potential line: at least a first pull-up capacitor with a first and second terminal: and a switching element connected between said first reference potential line and said first terminal of said first capacitor; said second terminal of said first capacitor receiving a pull-up signal switching between a first value and a second value higher than the first value: wherein said switching element comprises a PMOS switching transistor with a control terminal: the circuit further comprising negative voltage source means having an output connected to said control terminal of said switching transistor, for generating a control signal of a third value lower than said first value of said pull-up signal; said negative voltage source means being turned on when said pull-up signal presents said first value; wherein said negative voltage source means comprise a second capacitor with a first and second terminal; and a MOS latch transistor with a first, second and control terminal; said first terminal of said second capacitor being connected to said second terminal of said first capacitor; said second terminal of said second capacitor being connected to said first terminal of said MOS latch transistor; said second terminal of said MOS latch transistor being connected to said control terminal of said switching transistor; and said control terminal of said latch transistor receiving a square-wave oscillating signal.

3. The circuit as claimed in claim 2, further comprising an inverting stage coupled between said first reference potential line and a second reference potential line; said inverting stage having an input receiving said square-wave oscillating signal, and an output connected to said second terminal of said first capacitor and to the control terminal of a bipolar switch; said bipolar switch being coupled between said second terminal of said second capacitor and said second reference potential line.

4. The circuit as claimed in claim 3, wherein said inverting stage comprises a first and second bipolar transistor of opposite types, and each having a first, second and control terminal; said first terminal of said first bipolar transistor being connected to said first reference potential line; said second terminal of said second bipolar transistor being connected to said second reference potential line; said control terminals of said first and second bipolar transistors being coupled to said input of said inverting stage; and said second terminal of said first bipolar transistor and said first terminal of said second bipolar transistor being connected to each other and defining said output of said inverting stage.

5. The circuit as claimed in claim 4, further comprising a first and second resistor coupled between said input of said inverting stage and respective control terminals of said first and second bipolar transistors.

6. The circuit as claimed in claim 5, wherein said bipolar switch comprises a third bipolar transistor; and in that it comprises a fourth bipolar transistor with a first terminal connected to said first reference potential line, a second terminal connected to said control terminal of said MOS switching transistor, and a control terminal coupled to said input of said inverting stage.

7. The circuit as claimed in claim 3, further comprising an output stage including a first MOS output transistor and an output capacitor in series with each other between said first terminal of said first capacitor and said second reference potential line.

8. The circuit as claimed in claim 7, wherein said first MOS output transistor is a P-channel type having a control terminal connected to said input of said inverting stage.

9. The circuit as claimed in claim 7, characterized in that said first MOS output transistor is a P-channel type having a control terminal connected to a first intermediate node formed by a series connection of a first controlled switch and a second controlled switch; said first controlled switch being coupled between said first intermediate node and a drain terminal of said first MOS output transistor, and having a control terminal connected to said second terminal of said MOS latch transistor; and said second controlled switch being coupled between said first intermediate node and said second reference potential line, and having a control terminal connected to said output of said inverting stage.

10. The circuit as claimed in claim 9, wherein said MOS switch transistor and said first MOS output transistor comprise a body region and a drain region shorted to each other.

11. The circuit as claimed in claim 7, wherein said MOS switch transistor and said first MOS output transistor comprise a body region and a drain region shorted to each other.

12. The circuit as claimed in claim 11, further comprising a voltage triplicating stage comprising a second MOS output transistor with a first and second terminal respectively connected to said first MOS output transistor and said output capacitor; a third capacitor with a first terminal receiving said square-wave oscillating signal, and a second terminal connected to said first terminal of said second MOS output transistor; and an inverting circuit comprising a third and fourth controlled switch complementary to each other and defining a second intermediate node; said third and fourth controlled switches having control terminals connected to each other and receiving a switching signal synchronous with said square-wave oscillating signal; said second intermediate node being connected to the control terminal of said second MOS output transistor; said third controlled switch being connected between said second terminal and said control terminal of said second MOS output transistor; and said fourth controlled switch being connected between said second intermediate node and said second reference potential line.

13. The circuit as claimed in claim 7, further comprising a voltage triplicating stage comprising a second MOS output transistor with a first and second terminal respectively connected to said first MOS output transistor and said output capacitor; a third capacitor with a first terminal receiving said square-wave oscillating signal, and a second terminal connected to said first terminal of said second MOS output transistor; and an inverting circuit comprising a third and fourth controlled switch complementary to each other and defining a second intermediate node; said third and fourth controlled switches having control terminals connected to each other and receiving a switching signal synchronous with said square-wave oscillating signal; said second intermediate node being connected to the control terminal of said second MOS output transistor; said third controlled switch being connected between said second terminal and said control terminal of said second MOS output transistor; and said fourth controlled switch being connected between said second intermediate node and said second reference potential line.

14. The circuit as claimed in claim 4, wherein said bipolar switch comprises a third bipolar transistor; the circuit further comprising a fourth bipolar transistor with a first terminal connected to said first reference potential line, a second terminal connected to said control terminal of said MOS switching transistor, and a control terminal coupled to said input of said inverting stage.

15. The circuit as claimed in claim, 14, further comprising a third and fourth resistor; said third resistor being coupled between said output of said inverting stage and said control terminal of said third bipolar transistor; and said fourth resistor being coupled between said input of said inverting stage and said control terminal of said fourth bipolar transistor.

16. The circuit as claimed in claim 15, wherein said first and fourth bipolar transistors are PNP types; said second and third bipolar transistors are NPN types; and said MOS latch transistor is an N-channel type.

17. The circuit as claimed in claim 14, wherein said first and fourth bipolar transistors are PNP types; said second and third bipolar transistors are NPN types; and said MOS latch transistor is an N-channel type.

18. The circuit as claimed in claim 17, further comprising an output stage including a first MOS output transistor and an output capacitor in series with each other between said first terminal of said first capacitor and said second reference potential line.

19. A voltage boost circuit comprising:
an input stage having an input and an output;
an output stage having an output;
a first transistor having a first terminal coupled to a first voltage supply, a second terminal and a third terminal;
a first capacitor having a first terminal coupled to said second terminal of said first transistor and a second terminal coupled to said output of said input stage;
a second transistor having a first terminal, a second terminal coupled to said third terminal of said first transistor and a third terminal coupled to said input of said input stage; and
a second capacitor having a first terminal coupled to said second terminal of said first capacitor and a second terminal coupled to said first terminal of said second transistor;
wherein said output stage is connected to said second terminal of said first transistor.

20. The circuit of claim 19, further comprising a third transistor having a first terminal coupled to said third terminal of said first transistor, a second terminal coupled to said first voltage supply, and a third terminal coupled to said input of said input stage.

21. The circuit of claim 20, further comprising a fourth transistor having a first terminal coupled to said first terminal of said second transistor, a second terminal coupled to a second voltage supply, and a third terminal coupled to said output of said input stage.

22. The circuit of claim 21, wherein said input stage comprises a fifth transistor having a first terminal coupled to said output of said input stage, a second terminal coupled to said first voltage supply, and a third terminal coupled to said input of said input stage; and
a sixth transistor having a first terminal coupled to said output of said input stage, a second terminal coupled to said second voltage supply, and a third terminal coupled to said input of said input stage.

23. The circuit of claim 22, wherein said output stage comprises a seventh transistor having a first terminal coupled to said second terminal of said first transistor, a second terminal coupled to said output of said output stage and a third terminal coupled to said input of said input stage; and
a third capacitor having a first terminal coupled to said output of said output stage and a second terminal coupled to said second voltage supply.

24. The circuit of claim 22, wherein said output stage comprises a seventh transistor having a first terminal coupled to said second terminal of said first transistor, a second terminal coupled to said output of said output stage and a third terminal;
an eighth transistor having a first terminal coupled to said output of said output stage, a second terminal coupled to said third terminal of said seventh transistor and a third terminal coupled to said second terminal of said second transistor;
a ninth transistor having a first terminal coupled to said third terminal of said seventh transistor, a second terminal coupled to said second voltage supply and a third terminal coupled to said third terminal of said fourth transistor; and
a third capacitor having a first terminal coupled to said output of said output stage and a second terminal coupled to said second voltage supply.

25. The circuit of claim 24, wherein said output stage further comprises a tenth transistor having a first terminal coupled to said second terminal of said seventh transistor, a second terminal coupled to said output of said output stage and a third terminal;
an inverter having an input terminal coupled to said first terminal of said ninth transistor and an output terminal coupled to said third terminal of said tenth transistor; and
a fourth capacitor having a first terminal coupled to said first terminal of said eighth transistor and a second terminal coupled to said input of said input stage.

26. The circuit of claim 25, wherein said inverter comprises an eleventh transistor having a first terminal coupled to said second terminal of said tenth transistor, a second terminal coupled to said output terminal of said inverter and a third terminal coupled to said input terminal of said inverter; and
a twelfth transistor having a first terminal coupled to said second voltage supply, a second terminal coupled to said output terminal of said inverter and a third terminal coupled to said input terminal of said inverter.

27. The circuit of claim 26, wherein said first, second, seventh, eighth, tenth, eleventh and twelfth transistors are MOS transistors.

28. The circuit of claim 27, wherein said first, seventh, eighth, tenth and eleventh transistors are PMOS transistors and said second and twelfth transistors are NMOS transistors.

29. The circuit of claim 28, wherein in each of said first, second, seventh, eighth, tenth, eleventh and twelfth transistors, said first terminal is a source terminal, said second terminal is a drain terminal and said third terminal is a gate terminal.

30. The circuit of claim 27, wherein said third, fourth, fifth, sixth and ninth transistors are bipolar transistors.

31. The circuit of claim 30, wherein said third and fifth transistors are PNP bipolar transistors and said fourth, sixth and ninth transistors are NPN bipolar transistors.

32. The circuit of claim 31, wherein in each of said third, fourth, fifth, sixth and ninth transistors, said first terminal is a collector terminal, said second terminal is an emitter terminal and said third terminal is a base terminal.

33. The circuit of claim 23, wherein said second terminal of said first transistor is connected to a body region of said first transistor, and said second terminal of said seventh transistor is connected to a body region of said seventh transistor.

34. The circuit of claim 23, wherein said first, second and seventh transistors are MOS transistors.

35. The circuit of claim 34, wherein said first and seventh transistors are PMOS transistors and said second transistor is a NMOS transistor.

36. The circuit of claim 34, wherein said third, fourth, fifth and sixth transistors are bipolar transistors.

37. The circuit of claim 36, wherein said third and fifth transistors are PNP bipolar transistors and said fourth and sixth transistors are NPN bipolar transistors.

38. The circuit of claim 22, wherein said third terminal of said fifth transistor is coupled to said input of said input stage through a first resistor and said third terminal of said sixth transistor is coupled to said input of said input stage through a second resistor.

39. The circuit of claim 38, wherein said third terminal of said third transistor is coupled to said input of said input stage through a third resistor, and said third terminal of said fourth transistor is coupled to said output of said input stage through a fourth resistor.

40. A voltage booster circuit comprising:
first storage means having a first terminal and second terminal;
first switch means having a first terminal connected to a first reference voltage and a second terminal connected to said first terminal of said first storage means; and
a negative voltage source connected between said second terminal of said first storage means and a control terminal of said first switch means;
wherein a pull-up voltage is supplied to said second terminal of said first storage means, said pull-up voltage switching between a first value and a second value higher than said first value;
wherein, when said pull-up voltage is at said first value, said negative voltage source supplies said control terminal of said first switch means with a voltage of a third value which is lower than said first value and lower than said first reference voltage, to saturate said first switch means and charge said first storage means to approximately said first reference voltage.

41. A voltage booster circuit comprising:
first storage means having a first terminal and second terminal;
first switch means having a first terminal connected to a first reference voltage and a second terminal connected to said first terminal of said first storage means;
a negative voltage source connected between said second terminal of said first storage means and a control terminal of said first switch means; and an input stage having an input terminal for receiving an input signal and an output terminal for outputting a pull-up voltage;

wherein said pull-up voltage is supplied to said second terminal of said first storage means, said pull-up voltage switching between a first value and a second value higher than said first value;

wherein, when said pull-up voltage is at said first value, said negative voltage source supplies said control terminal of said first switch means with a voltage of a third value which is lower than said first value, to saturate said first switch means and charge said first storage means to approximately said first reference voltage;

wherein said negative voltage source comprises a second switch means having a control terminal connected to said input terminal of said input stage and a first terminal connected to said control terminal of said first switch means, and a second storage means, having a first terminal connected to said second terminal of said first storage means and a second terminal connected to a second terminal of said second switch means.

42. The circuit of claim 41, wherein said input stage comprises means for inverting said input signal to provide said pull-up voltage at said output terminal of said input stage.

43. The circuit of claim 42, further comprising a third switch means having a control terminal connected to said input terminal through a first resistor, a first terminal connected to said first reference voltage and a second terminal connected to said first terminal of said second switch means.

44. The circuit of claim 43, further comprising a fourth switch means having a control terminal connected to said output terminal of said input stage through a second resistor, a first terminal connected to said second terminal of said second switch means, and a second terminal connected to a second reference voltage.

45. The circuit claim 44, further comprising an output stage having an output terminal, a fifth switch means having a first terminal connected to said second terminal of said first switch means and a second terminal coupled to said output terminal of said output stage, and a third storage means coupled between said output terminal of said output stage and said second reference voltage.

46. The circuit of claim 45, wherein said output stage further comprises a sixth switch means having a control terminal connected to said first terminal of said second switch means, a first terminal connected to said second terminal of said fifth switch means and a second terminal connected to a control terminal of said fifth switch means; and a seventh switch means having a first terminal connected to said control terminal of said fifth switch means, a second terminal connected to said second reference terminal and a control terminal connected to said output terminal of said input stage through a third resistor.

47. The circuit of claim 46 wherein said output stage further comprises an eighth switch means having a first terminal connected to said second terminal of said fifth switch means, and a second terminal connected to said output terminal of said output stage;

an inverter having an input terminal connected to said first terminal of said seventh switch means and an output terminal connected to a control terminal of said eighth switch means; and a fourth storage means connected between said second terminal of said fifth switch means and said input terminal of said input stage.

48. The circuit of claim 47, wherein said inverter comprises a ninth switch means having a control terminal connected to said input terminal of said inverter, a first terminal connected to said second terminal of said eighth switch means and a second terminal connected to said output terminal of said inverter; and a tenth switch means having a control terminal connected to said input terminal of said inverter, a first terminal connected to said output terminal of said inverter and a second terminal connected to said second reference voltage.

49. The circuit of claim 48, wherein said first, fifth, sixth, eighth and ninth switch means are PMOS transistors, said second and tenth switch means are NMOS transistors, said third switch means is a PNP bipolar transistor and said fourth and seventh switch means are NPN bipolar transistors.

50. The circuit of claim 45, wherein said second terminal of said first switch means is connected to a body region of said first switch means and said second terminal of said fifth switch means is connected to a body region of said fifth switch means.

51. The circuit of claim 50, wherein said first and fifth switch means are PMOS transistors and said second terminal of each transistor is a drain terminal.

* * * * *